April 13, 1965    L. L. McDONALD, JR    3,177,633
OXYGEN ENRICHER FOR COMBUSTION ENGINES
Filed Sept. 29, 1961
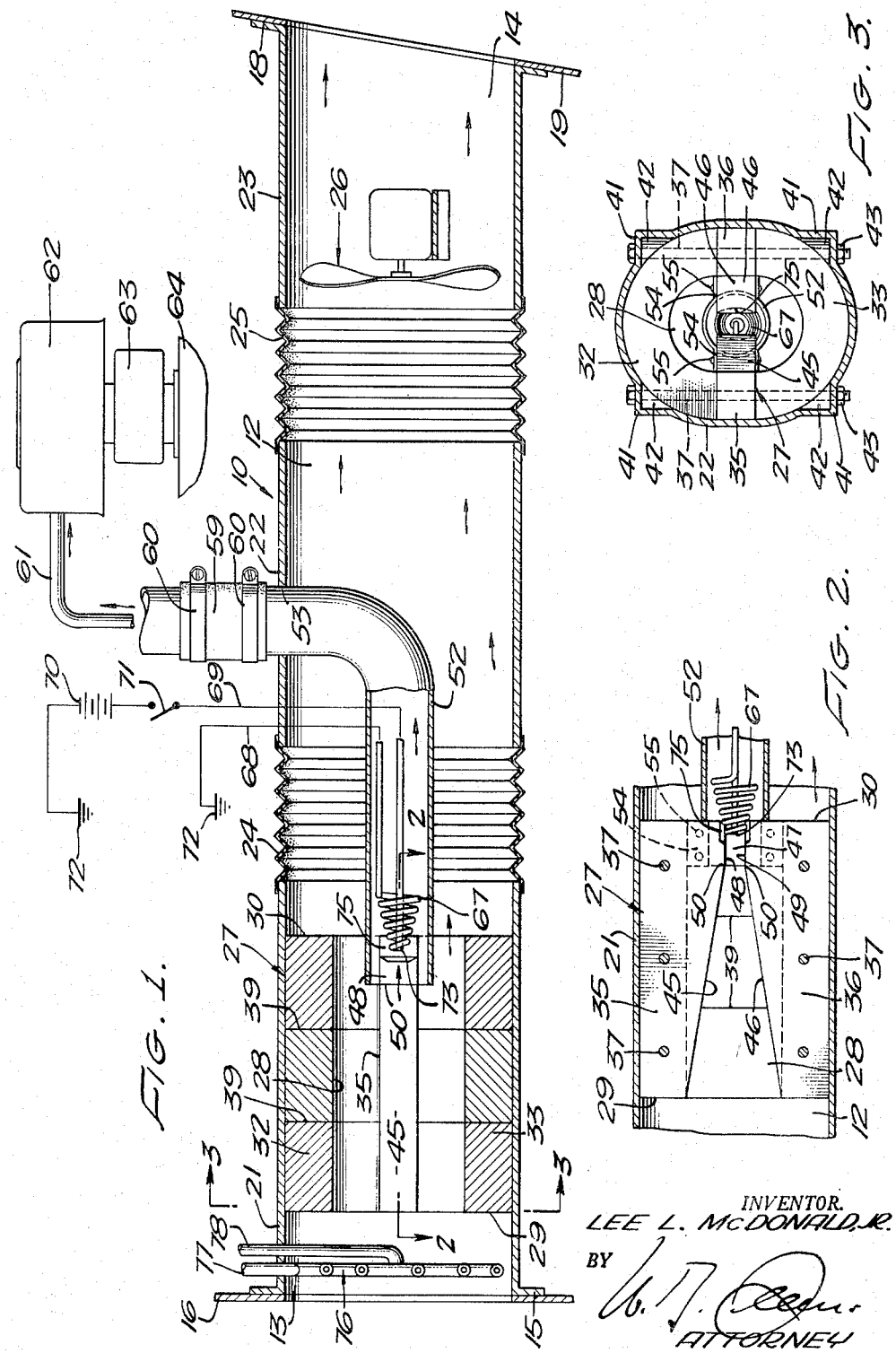
INVENTOR.
LEE L. McDONALD, JR.
BY
ATTORNEY 3,177,633
OXYGEN ENRICHER FOR COMBUSTION ENGINES
Lee L. McDonald, Jr., 1506 Cheviotdale Drive,
Pasadena, Calif.
Filed Sept. 29, 1961, Ser. No. 141,658
2 Claims. (Cl. 55—100)

This invention relates to an apparatus for separating a gas containing a paramagnetic constituent and a diamagnetic constituent into two streams, one having a higher concentration of the paramagnetic constituent than the other.

The invention is based upon the principle that paramagnetic substances are attracted by a magnetic field while diamagnetic substances are repelled. Oxygen is peculiar as a gas in that it is paramagnetic. Nitric oxide is another gas which is paramagnetic, its magnetic permeability being slightly less than that of oxygen. Virtually all other gases are diamagnetic. This invention makes use of the high permeability of oxygen by employing a magnet in a conduit to increase the oxygen concentration of air in a core of a stream of air flowing through the conduit, and provides for separate withdrawal of the oxygen enriched air from that core.

The invention is especially well-suited for supplying oxygen enriched air to the carburetor of an internal combustion engine. Fuels for motor vehicles have been developed to a high degree of efficiency, but for complete energy conversion require more oxygen per unit combustible than is provided by the normal atmospheric mixture. By increasing the concentration of oxygen in air to be mixed with fuel gases as taught by this invention, the ratio of air to fuel may be maintained at the most efficient proportions of dispersal. The active constituents of the fuel-air mixture supplied to the combustion chambers is proportionally higher than otherwise and increased power and reduced exhaust waste results.

It is a general object of this invention to provide an apparatus for concentrating a paramagnetic constituent of a mixture of paramagnetic and diamagnetic gases along a column within a stream of the mixture and for separating the enriched column of the stream from the remaining part.

Another object of this invention is to provide an apparatus for increasing the concentration of oxygen in air supplied to the carburetor of an internal combustion engine.

Another characteristic of oxygen is that its magnetic permeability or susceptibility varies inversely as its absolute temperature. This property of oxygen is made use of in this invention by heating the paramagnetic enriched part of a gas being treated at a place adjacent and downstream of the region where concentration occurs due to magnetic attraction. Heating of the oxygen reduces its susceptibility and its attraction toward the magnetic field rendering it easier to withdraw from the field.

The effect of temperature on the susceptibility of oxygen is further made use of in this invention by cooling the gas mixture to be treated prior to passage through the magnetic field whereby the cooled oxygen will be more strongly attracted to within the flux dense region of the magnetic field.

A specific object of this invention is to provide apparatus for oxygen enriching air supplied to the carburetor of an internal combustion engine, the apparatus being simple and rugged in construction and reliable in operation.

These and other more specific objects will appear during the course of the following part of this specification and claims and upon considering in connection therewith the attached drawings.

Referring now to the drawings in which a preferred embodiment of the invention is illustrated.

FIGURE 1 is a central longitudinal section through an apparatus of this invention for supplying oxygen enriched air to the carburetor of a motor vehicle, the carburetor and associated parts being shown schematically;

FIGURE 2 is a longitudinal central section taken along line 2—2 of FIGURE 1; and FIGURE 3 is a cross-section upon line 3—3 of FIGURE 1.

The illustrated apparatus of this invention comprises a conduit 10 having an open-ended passageway 12 extending from an inlet end opening 13 to an outlet end opening 14. At its inlet end, conduit 10 has an outwardly extending annular flange 15 for securing the conduit to an apertured support wall 16, and the outlet end of the conduit is similarly provided with a flange 18 for support on a wall 19. For simplicity in manufacture and for permitting convenient replacement of parts, conduit 10 is formed of three tubular sections 21, 22 and 23, adjacent pairs of ends of the sections being interconnected by flexible joints 24 and 25 of corrugated construction. A fan 26 in the downstream end section 23 causes a current of air to flow through the conduit.

In the upstream end section 21 there is a magnet assembly designated generally by reference numeral 27, having an axial passage 28, an upstream end surface 29, and a downstream end surface 30. Magnet passage 28 constitutes a section of the conduit passageway 12. The magnet assembly is formed of two arcuate halves 32 and 33, each of semicircular cross-section, and two pole pieces 35 and 36. Pole piece 35 is positioned between one set of ends of common polarity of the magnet halves, and pole piece 36 is positioned between the diametrically opposite set of magnet ends. The magnet parts are secured together by bolts 37. Each of the magnet halves 32 and 33 of the illustrated embodiment is constituted of three permanent magnet elements arranged side by side, the lines of abutment of the magnet elements of the arcuate half 32 being designated by the numeral 39. As there are three magnet elements in each magnet half, there are six bolts 37 for securing the magnet elements on one side of the assembly to their diametrically opposed elements on the other side of the assembly. The pole pieces 35, and 36, extending throughout the length of the assembly, hold the several magnet elements together. Conduit section 21 has a plurality of bulges 41 for accommodating complementally-shaped bosses 42 on the magnet elements. The bolts 37 extend through respective sets of opposite bosses and bulges and have nuts 43 on their ends. Thus relative rotation and axial movement of the magnet assembly in the conduit is prevented.

Pole pieces 35 and 36 have a greater dimension measured radially in the conduit at their downstream ends than at their upstream ends, and they present a pair of converging inside surfaces 45 and 46 respectively, leading to a narrowed place or throat 47 of the magnet passage 28. Throat 47 is defined between two parallel and mutually facing inside surfaces 48 and 49 of the pole pieces 35 and 36 respectively, the corner or edge at which surface 48 of pole piece 35 meets the flat surface 45 of that pole piece being designated by numeral 50. The pole pieces being nearer each other at their downstream ends, the region of greatest flux density of the magnet assembly will be in the throat 47. Apparatus of this invention having a space of about one-half inch between the throat defining surfaces 48 and 49 produces good results. The exposed surfaces of the pole pieces are made smooth and corrosive inhibiting as by chromium plating.

Throat 47 is surrounded by the inlet end of a collector tube 52 extending axially in the conduit 10 from the magnet assembly and out through an opening 53 in the intermediate conduit section 22. The inlet end of tube 52 is cut to provide outwardly extending flaps 54 through which bolts 55 extend to secure the tube on the pole pieces 35 and 36.

Collector tube 52 is connected outside the conduit 10 by means of a sleeve 59 and band clamps 60 to flow line 61 leading to an air filter 62 of an internal combustion engine. A carburetor connected to the air filter is represented in the drawing at 63 and an intake manifold at 64.

As thus far described, it will be apparent that when the fan 26 is energized it will cause air to enter the passageway 12 at its inlet end opening 13 will draw the air through the axial passage 28 of the permanent magnet assembly 27. Inasmuch as the pole pieces 35 and 36 have their inside surfaces 45 and 46 inclined toward each other, the paramagnetic constituent, i.e., oxygen, of the air is subjected to a force drawing its molecules toward the axis of the magnet passage. The diamagnetic constituents of the air, e.g., nitrogen, will be repelled by the flux dense field between the pole pieces and an appreciable number of its molecules will diffuse outward in the magnet passage to beyond the periphery of the collector tube 52. Thus the column or core of air which passes through the region of greatest flux density will have a higher concentration of oxygen than that remote from the magnet axis. Flow of air through the conduit 10 will cause the air core of higher oxygen concentration to be swept into the collector tube for flow to the air filter 60 and the carburetor 63 where it is mixed with fuel gas. The cylindrical column of air of higher nitrogen content will flow along the outside of the collector tube and be exhausted through the conduit outlet 14.

A small electric heating coil 67 is positioned in the collector tube 52 proximate the inlet end of the tube. The terminals of the heating coil are connected by leads 68 and 69 in a circuit containing a battery 70, switch 71, and ground connections 72. The heating coil of the illustrated embodiment is of helical-conical form with its apex 73 positioned in the downstream end of the throat 47. The pole pieces are recessed as shown at 75 to space them from the heating coil. Inasmuch as the magnetic susceptibility of oxygen decreases as the temperature of the oxygen is raised, the heating coil 67 serves to decrease the magnetic attraction of the oxygen downstream of the throat 47 allowing it to flow through the collector tube.

The illustrated embodiment makes further use of that property of oxygen according to which its magnetic susceptibility varies inversely with its temperature by employing a cooler 76 in the conduit 10 adjacent inlet end opening 13 and in the form of helical tube having a cooling-fluid inlet 77 and an outlet 78. Cooling of the air prior to flow through the tapering magnet passage 28 increases the magnetic susceptibility of the oxygen causing the oxygen molecules to be deflected by the inclined surfaces 45 and 46 with increased force toward the axis of the magnet for collection in the tube 52.

While the particular oxygen enricher for combustion engines herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. Apparatus for separating air into an oxygen-enriched stream and an oxygen-impoverished stream comprising, an elongated conduit having an inlet and an outlet, permanent magnet means between the opposite ends of said conduit comprising two opposed arcuate halves each of substantially semi-circular U-shaped cross section and a third section positioned therebetween and having a pair of poles projecting inwardly from the opposite sides of said conduit with the opposed pole faces spaced equally from the conduit axis, said pole faces being substantially flat and converging on a long acute angle taper from the edge adjacent said air inlet opening to form a narrow throat coaxially of said conduit remote from said air inlet and across which the flux density is at a maximum, a relatively small diameter conduit having an inlet end in coaxial alignment with the downstream end of said throat and connected to the pair of poles and an outlet external of the conduit for carrying away oxygen-enriched air from said throat, heating means adjacent the inlet end of said last-mentioned conduit to facilitate the escape of oxygen from the influence of the high density flux field prevailing in said throat, and means for conducting oxygen impoverished air from the outlet end of said first-mentioned conduit.

2. Apparatus for separating a gaseous mixture containing paramagnetic and diamagnetic constituents into two streams the first of which is enriched with the paramagnetic constituent and the second of which is enriched with the diamagnetic constituent, said apparatus comprising an elongated first conduit comprising two opposed arcuate halves each of substantially semi-circular U-shaped cross section and a third section positioned therebetween and having an inlet end and an outlet end, permanent magnet means having a pair of wide relatively thin pole faces projecting toward the axis of said conduit from diametrically opposed sides thereof with the wide opposed end portions thereof converging toward said conduit outlet along the axis of the conduit to form a relatively narrow throat connected to said pair of poles and spaced axially inwardly from said outlet end, said pole faces cooperating to form a core zone therebetween traversed by a flux field of gradually increasing flux density in the direction of gaseous flow between said inlet and outlet ends and effective to form a core stream of gas in said throat enriched with said paramagnetic constituent and a surrounding stream of gas enriched with said diamagnetic constituent, a second conduit having an inlet end in coaxial alignment with the outlet end of said throat and extending out of said first conduit, and heater means at the inlet end of said second conduit for facilitating the escape of the paramagnetic constituent from the influence of said high density flux field.

References Cited by the Examiner

UNITED STATES PATENTS

| 513,183 | 12/94 | Harris | 210—42 |
|---|---|---|---|
| 1,364,136 | 1/21 | Palmer | 55—3 |
| 1,546,632 | 7/25 | Dow et al. | 55—3 |
| 1,575,587 | 3/26 | Haynes | 55—100 |
| 1,957,209 | 1/34 | Hedley et al. | 55—100 |
| 2,444,222 | 6/48 | Craig. | |
| 2,637,408 | 5/53 | Yadoff | 55—100 |
| 3,064,465 | 11/62 | Richardson | 73—27 |

OTHER REFERENCES

Eckman D. P., Industrial Instrumentation, New York, John Wiley and Sons, pages 184–185, 1953.

Perry J. H., Chemical Engineers Handbook, New York, McGraw-Hill, 1941, pp. 2686 to 2688, TP 155 P4.

REUBEN FRIEDMAN, *Primary Examiner.*

HERBERT L. MARTIN, *Examiner.*